(12) United States Patent
Fukushima et al.

(10) Patent No.: US 6,208,391 B1
(45) Date of Patent: *Mar. 27, 2001

(54) LCD DEVICE WITH A BUILT-IN ELECTROLUMINESCENT BODY AND METHOD OF PRODUCING THE SAME

(75) Inventors: Kenji Fukushima; Koji Umeda, both of Saitama (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/204,688

(22) Filed: Dec. 3, 1998

(30) Foreign Application Priority Data

Dec. 3, 1997 (JP) ...................................... 9-333188

(51) Int. Cl.$^7$ .................................................. G02F 1/1335
(52) U.S. Cl. ............................................................. 349/69
(58) Field of Search ....................................... 349/69

(56) References Cited

U.S. PATENT DOCUMENTS

| | | | |
|---|---|---|---|
| 4,500,173 | * 2/1985 | Leibowitz et al. ...................... | 349/69 |
| 4,772,885 | * 9/1988 | Uehara et al. ........................... | 349/69 |
| 5,121,234 | * 6/1992 | Kucera .................................... | 349/69 |
| 5,504,599 | * 4/1996 | Okibayashi et al. .................... | 349/69 |
| 5,841,494 | * 11/1998 | Hall ........................................ | 349/98 |
| 5,852,485 | * 12/1998 | Shimada et al. ........................ | 349/38 |

FOREIGN PATENT DOCUMENTS

| | | |
|---|---|---|
| 2 225 894 | 6/1990 | (GB) . |
| 58-118690 | 7/1983 | (JP) . |
| 61-174587 | 8/1986 | (JP) . |
| 62-84020 | 5/1987 | (JP) . |
| 1-253713 | 10/1989 | (JP) . |
| 3-020317 | 2/1991 | (JP) . |
| 3-20317 | 2/1991 | (JP) . |
| 6-186561 | 7/1994 | (JP) . |
| 8-234176 | 9/1996 | (JP) . |
| 9-244061 | 9/1997 | (JP) . |
| WO 97/12276 | 4/1997 | (WO) . |

* cited by examiner

*Primary Examiner*—Kenneth Parker
(74) *Attorney, Agent, or Firm*—Scully, Scott, Murphy & Presser

(57) ABSTRACT

An LCD (Liquid Crystal Display) device with a built-in electroluminescent body of the present invention includes a liquid crystal cell having an upper LCD substrate, a lower LCD substrate, and a liquid crystal layer formed between the upper LCD substrate and the lower LCD substrate by the injection of liquid crystal. An upper polarizer and a lower polarizer are respectively positioned on the top and the bottom of the liquid crystal cell. The electroluminescent body is arranged on the lower polarizer in the form of wirings for implementing back illumination. Dust and other impurities are prevented from penetrating the gap between an LCD and an EL (Electroluminescent Lamp) at the time of production. The lower polarizer plays the role of an EL substrate at the same time and thereby eliminates the need for an EL substrate and an affixing material. The LCD device can be produced by a minimum of steps.

11 Claims, 1 Drawing Sheet

LCD DEVICE WITH A BUILT-IN ELECTROLUMINESCENT BODY AND METHOD OF PRODUCING THE SAME

BACKGROUND OF THE INVENTION

The present invention relates to an LCD (Liquid Crystal Display) device with a built-in electroluminescent body and a method of producing the same.

An LCD device is generally made up of an LCD, an EL (Electroluminescent Light), and a material intervening between and affixing the LCD and EL. Japanese Patent Laid-Open Publication No. 8-234176, for example, teaches a composite polymer and liquid crystal display device including upper and lower transparent electrodes. A photoconductive layer, a light shield layer, a reflection layer and a composite polymer and liquid crystal layer are sequentially laminated between the upper and lower transparent electrodes. An electroluminescent layer is formed on the other surface of each transparent electrode via a transparent solid layer and sandwiched between transparent row electrodes and transparent column electrodes. Japanese Patent Laid-Open Publication No. 58-118690 discloses a color display device which is the combination of a liquid crystal display element and a field emission display element. The liquid crystal display element and field emission display element are laminated and allow their colors to be selected, preferably in a complementary relation.

However, a problem with each of the above conventional LCD devices is that the affixing material intervening between the LCD and the EL increases the overall thickness of the device. Another problem is that dust and other impurities are apt to penetrate the gap between the LCD and the EL at the time of assembly. The impurities form shadows when the EL emits light and thereby degrades display quality.

Technologies relating to the present invention are also disclosed in, e.g., Japanese Patent Laid-Open Publication No. 4-299310.

SUMMARY OF THE INVENTION

It is therefore an object of the present invention to provide a simple, high quality LCD device with a built-in electroluminescent body, and a method of producing the same.

An LCD (Liquid Crystal Display) device with a built-in electroluminescent body of the present invention includes a liquid crystal cell having an upper LCD substrate, a lower LCD substrate, and a liquid crystal layer formed between the upper LCD substrate and the lower LCD substrate by the injection of liquid crystal. An upper polarizer and a lower polarizer are respectively positioned on the top and the bottom of the liquid crystal cell. The electroluminescent body is arranged on the lower polarizer in the form of wirings for implementing back illumination.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
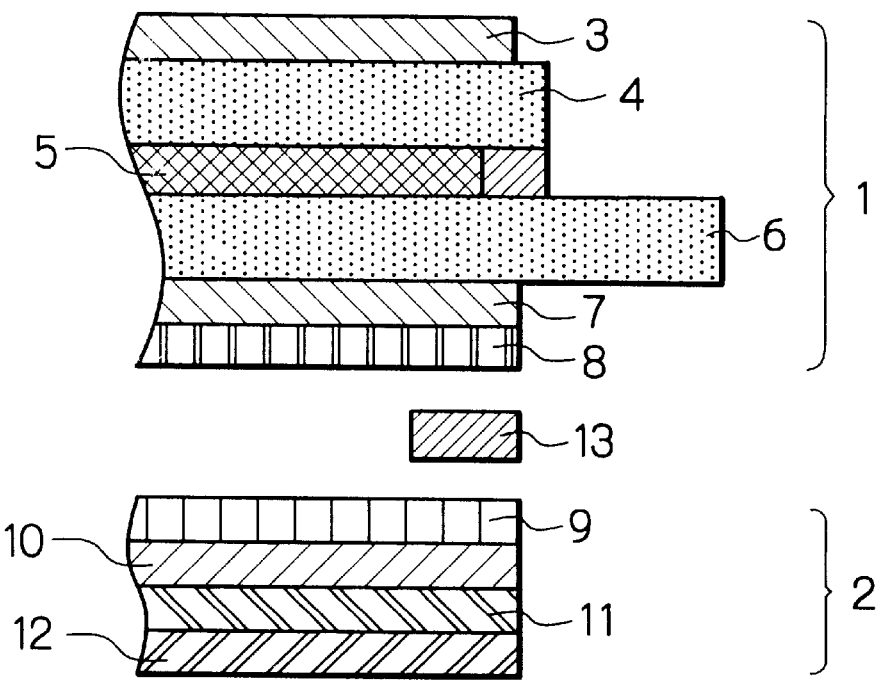
FIG. 1 is a section showing a conventional LCD device.

To better understand the present invention, brief reference will be made to a conventional LCD device, shown in FIG. 1. As shown, the LCD device is generally made up of an LCD 1, an EL 2, and a material 13 intervening between and affixing the LCD 1 and EL 2. The LCD 1 has an upper polarizer 3, an upper LCD substrate 4, a liquid crystal layer 5, a lower LCD substrate 6, a lower polarizer 7 and a reflector 8 sequentially laminated in this order. Transparent electrodes are formed on each of the upper substrate 4 and lower substrate 6 by evaporation. The LE 2 is a laminate consisting of an EL substrate 9, an electroluminescent layer 10, a back electrode layer 11, and an insulation layer 12 for reflection.

The above conventional LCD device has some problems left unsolved, as discussed earlier.

Figure 2:
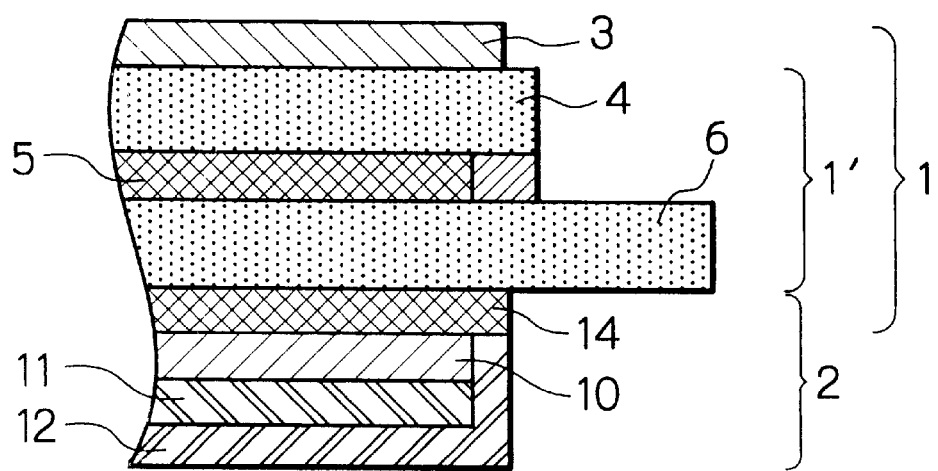
FIG. 2 is a section showing an LCD device embodying the present invention.

Referring to FIG. 2, an LCD device embodying the present invention and a method of producing the same will be described. As shown, the LCD device includes an LCD 1 including a liquid crystal cell 1' and an EL 2. More specifically, the LCD device is a laminate consisting of an upper polarizer 3, an upper LCD substrate 4, a liquid crystal layer 5, a lower LCD substrate 6, an electroluminescent layer 10, an EL back electrode layer 11, an insulation layer 12 for reflection, and a lower polarizer 14 formed with transparent electrodes by evaporation.

Liquid crystal is injected between the upper and lower LCD substrates 4 and 6 each carrying transparent electrodes formed by evaporation, thereby forming the liquid crystal layer 5. The lower polarizer 14 is positioned below the liquid crystal cell 1'. An electroluminescent body is arranged on the lower polarizer 14 in the form of wirings for implementing back illumination. Then, the electroluminescent layer 10, back electrode layer 11 and insulation layer 12 are sequentially laminated.

As for the lower polarizer 14, transparent electrodes are formed on the rear of the polarizer for applying a voltage to the EL, and then patterning and etching form electrode wirings. Subsequently, the EL back electrode layer 11 and insulation layer 12 are sequentially laminated by printing. The upper polarizer 3 and lower polarizer 14 are respectively positioned on the top and the bottom of the liquid crystal cell 1'.

As stated above, in the illustrative embodiment, the lower polarizer 14 is formed on the bottom of the liquid crystal cell 1' carrying the upper polarizer 3 on its top. In this configuration, the lower polarizer 14 plays the role of a substrate. The wirings of the electroluminescent body are formed on the lower polarizer 3. The laminate of the electroluminescent layer 10, EL back electrode layer 11 and insulation layer 12 is positioned beneath the liquid crystal cell 1'.

In summary, it will be seen that the present invention provides an LCD device and a method of producing the same capable of preventing dust and other impurities from penetrating a gap between an LCD and an EL at the time of production. Further, a lower polarizer plays the role of an EL substrate at the same time and thereby eliminates the need for an EL substrate and an affixing material. Consequently, the LCD device of the present invention can be produced by a minimum of steps.

Various modifications will become possible for those skilled in the art after receiving the teachings of the present disclosure without departing from the scope thereof.

What is claimed is:

1. A liquid crystal display device with a built-in electroluminescent body, comprising:

a liquid crystal cell comprising an upper substrate, a lower substrate, and a liquid crystal layer formed between said upper substrate and said lower substrate by injection of liquid crystal;

an upper polarizer positioned on a top of said liquid crystal cell;

a lower polarizer positioned on a bottom of said liquid crystal cell, the lower polarizer having wirings directly formed on a lower surface thereof;

an electroluminescent body comprising said lower polarizer and electroluminescent material sandwiched between said lower surface of said lower polarizer and a back electrode layer electrically cooperating with the wirings for implementing back illumination of the liquid crystal cell; and an insulation layer disposed on the back electrode layer for reflection of the back illumination towards the liquid crystal cell.

2. The device as claimed in claim 1, wherein transparent electrodes are formed on either one of said upper substrate and said lower substrate by evaporation.

3. The device as claimed in claim 2, further comprising an insulation layer disposed on the back electrode layer for reflection of the back illumination towards the liquid crystal cell.

4. The device as claimed in claim 2, wherein said wirings are formed on said lower surface of said lower polarizer by evaporation to form a transparent electrode layer and said transparent electrode layer is patterned and etched to form said wirings.

5. The device as claimed in claim 1, further comprising an insulation layer disposed on the back electrode layer for reflection of the back illumination towards the liquid crystal cell.

6. The device as claimed in claim 1, wherein said wirings are formed on said lower surface of said lower polarizer by evaporation to form a transparent electrode layer and said transparent electrode layer is patterned and etched to form said wirings.

7. The device as claimed in claim 1, wherein said wirings are formed on said lower surface of said lower polarizer by evaporation to form a transparent electrode layer and said transparent electrode layer is patterned and etched to form said wirings.

8. A method of producing a liquid crystal device, comprising the steps of:

producing a liquid crystal cell comprising an upper substrate, a lower substrate, and a liquid crystal layer formed between said upper substrate and said lower substrate by injection of liquid crystal;

forming an upper polarizer on a top of said liquid crystal cell;

forming a lower polarizer on a bottom of said liquid crystal cell having wirings directly formed on a lower surface thereof;

forming a laminate of an electroluminescent layer of an electroluminescent body, a back electrode layer and an insulation layer for reflection; and forming an insulation layer disposed on the back electrode layer for reflection of the back illumination towards the liquid crystal cell;

wherein said electroluminescent body is arranged on said lower surface of said lower polarizer such that said back electrode layer electrically cooperates with the wirings for implementing back illumination of the liquid crystal cell.

9. The method as claimed in claim 8, further comprising the step of forming transparent electrodes on either one of said upper substrate and said lower substrate by evaporation.

10. The method as claimed in claim 9, further comprising the step of patterning and etching said transparent electrodes to thereby form wirings for applying a voltage across the liquid crystal material.

11. The method as claimed in claim 8, further comprising the steps of:

forming said wirings on said lower surface of said lower polarizer by evaporation to form a transparent electrode layer; and patterning and etching said transparent electrode layer to form said wirings.

* * * * *

UNITED STATES PATENT AND TRADEMARK OFFICE
CERTIFICATE OF CORRECTION

PATENT NO.   : 6,208,391 B1  
DATED        : March 27, 2001  
INVENTOR(S)  : K. Fukishima et al.

Page 1 of 1

It is certified that error appears in the above-identified patent and that said Letters Patent is hereby corrected as shown below:

<u>Title page,</u>  
Item [56], References Cited, FOREIGN PATENT DOCUMENTS,  
Insert -- 4-299310      10/1992  (JP) --

Signed and Sealed this

Fifth Day of February, 2002

Attest:

JAMES E. ROGAN  
*Director of the United States Patent and Trademark Office*

*Attesting Officer*